US011782980B1

(12) United States Patent
 Aronoff

(10) Patent No.: US 11,782,980 B1
(45) Date of Patent: Oct. 10, 2023

(54) VIDEO NAVIGATION NORMALIZED BY RELEVANCE

(71) Applicant: Meta Platforms, Inc., Menlo Park, CA (US)

(72) Inventor: Brendan Benjamin Aronoff, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/214,476

(22) Filed: Mar. 26, 2021

(51) Int. Cl.
| | |
|---|---|
| *G06F 16/735* | (2019.01) |
| *G06F 16/74* | (2019.01) |
| *G06F 16/738* | (2019.01) |
| *G06F 3/0485* | (2022.01) |
| *G06F 16/78* | (2019.01) |
| *G06F 16/783* | (2019.01) |

(52) U.S. Cl.
CPC .......... *G06F 16/735* (2019.01); *G06F 3/0485* (2013.01); *G06F 16/739* (2019.01); *G06F 16/743* (2019.01); *G06F 16/783* (2019.01); *G06F 16/7867* (2019.01); *G06F 2203/04806* (2013.01)

(58) Field of Classification Search
CPC .... G06F 16/735; G06F 16/743; G06F 16/783; G06F 16/739
See application file for complete search history.

(56) References Cited

U.S. PATENT DOCUMENTS

| | | | |
|---|---|---|---|
| 9,325,946 B2 | 4/2016 | Tanaka et al. | |
| 9,345,966 B2 | 5/2016 | Miura et al. | |
| 9,626,103 B2 | 4/2017 | White et al. | |
| 10,115,022 B2 | 10/2018 | Kim et al. | |
| 10,204,273 B2 | 2/2019 | Matias et al. | |
| 2004/0239686 A1* | 12/2004 | Koyama | G06Q 10/107 345/620 |

(Continued)

OTHER PUBLICATIONS

Higuch, K., et al., "EgoScanning: Quickly Scanning First-Person Videos with Egocentric Elastic Timelines." Video Smart "Viewers", CHI 2017, May 6-11, 2017, Denver, CO (US), pp. 6536-6546.

(Continued)

*Primary Examiner* — Vaishali Shah
(74) *Attorney, Agent, or Firm* — McDermott Will & Emery LLP

(57) ABSTRACT

Methods, systems, and storage media for video navigation normalized by relevance are disclosed. Exemplary implementations may: obtain a plurality of videos recorded in a chronological order; stitch the plurality of videos together in a timeline based on the chronological order, the timeline comprising a visual menu; obtain information associated with the plurality of videos; determine, based on a measure of relevance, a ranking of videos among the plurality of videos; determine, based on the ranking of videos, one or more salient videos from among the plurality of videos, the one or more salient videos comprising a video that is within a range of the ranking of videos; obtain one or more representations associated with individual ones of the one or more salient videos; and cause display of the one or more representations in the timeline, the representations being arranged based at least in part on the chronological order.

18 Claims, 7 Drawing Sheets

(56) References Cited

U.S. PATENT DOCUMENTS

| | | | | |
|---|---|---|---|---|
| 2005/0088413 A1* | 4/2005 | Brewer | ............... | G06F 3/03543 |
| | | | | 345/157 |
| 2006/0146148 A1* | 7/2006 | Burke | ................. | H04N 7/0122 |
| | | | | 348/240.99 |
| 2008/0148177 A1* | 6/2008 | Lang | .................... | G06F 3/0481 |
| | | | | 715/788 |
| 2010/0281371 A1 | 11/2010 | Warner et al. | | |
| 2011/0052155 A1* | 3/2011 | Desmarais | ......... | H04N 21/4788 |
| | | | | 386/280 |
| 2013/0163956 A1* | 6/2013 | Medhurst | ........... | H04N 21/8547 |
| | | | | 386/E5.003 |
| 2013/0332850 A1* | 12/2013 | Bovet | .................. | G06F 3/0482 |
| | | | | 715/752 |
| 2014/0229835 A1* | 8/2014 | Ravine | ................... | H04L 65/61 |
| | | | | 709/206 |
| 2014/0355960 A1 | 12/2014 | Paulus et al. | | |
| 2015/0293996 A1* | 10/2015 | Liu | ....................... | G06F 16/739 |
| | | | | 707/723 |
| 2016/0357366 A1* | 12/2016 | Migos | .................. | G06F 40/103 |

OTHER PUBLICATIONS

TechHive—"Ring's New Timeline Feature." Viewed on Oct. 20, 2020 at https://www.youtube.com/watch?v=Zrqt44zwerg&feature=youtu.be (see 00:23-01:10).

* cited by examiner

VIDEO NAVIGATION NORMALIZED BY RELEVANCE

TECHNICAL FIELD

The present disclosure generally relates to capturing and navigating video clips, and more particularly to intuitive capturing of new video clips and navigating video clips, normalized by relevance, to be shared over a social network.

BACKGROUND

Videos are a popular way of communicating information and providing entertainment to people. Video-sharing services allow video clips to be recorded and shared with a network of users. The video clips may be navigated for a variety of purposes prior to being shared. Unfortunately, conventional video-sharing services provide limited video navigating capabilities.

BRIEF SUMMARY

The subject disclosure provides for systems and methods for navigating video clips. A user is allowed to navigate video clips of a series of video clips by scrolling through thumbnails of the video clips normalized by relevance and displayed in a timeline. For example, the thumbnails may depict content from the video clips that is relevant to a search term.

One aspect of the present disclosure relates to a method for video navigation normalized by relevance. The method may include obtaining information associated with a plurality of videos. The method may include determining, based on a measure of relevance, a ranking of videos among the plurality of videos. The method may include determining, based on the ranking of videos, one or more salient videos from among the plurality of videos. The method may include obtaining one or more representations associated with individual ones of the one or more salient videos. The method may include presenting the one or more representations via a visual menu. The one or more representations may be arranged chronologically according to associated salient videos.

Another aspect of the present disclosure relates to a system configured for video navigation normalized by relevance. The system may include one or more hardware processors configured by machine-readable instructions. The processor(s) may be configured to obtain information associated with a plurality of videos. The processor(s) may be configured to determine, based on a measure of relevance, a ranking of videos among the plurality of videos. The processor(s) may be configured to determine, based on the ranking of videos, one or more salient videos from among the plurality of videos. The processor(s) may be configured to obtain one or more representations associated with individual ones of the one or more salient videos. The processor(s) may be configured to present the one or more representations via a visual menu. The one or more representations may be arranged chronologically according to associated salient videos.

Yet another aspect of the present disclosure relates to a non-transient computer-readable storage medium having instructions embodied thereon, the instructions being executable by one or more processors to perform a method for video navigation normalized by relevance. The method may include obtaining information associated with a plurality of videos. The method may include determining, based on a measure of relevance, a ranking of videos among the plurality of videos. The method may include determining, based on the ranking of videos, one or more salient videos from among the plurality of videos. The method may include obtaining one or more representations associated with individual ones of the one or more salient videos. The method may include presenting the one or more representations via a visual menu. The one or more representations may be arranged chronologically according to associated salient videos.

Still another aspect of the present disclosure relates to a system configured for video navigation normalized by relevance. The system may include means for obtaining information associated with a plurality of videos. The system may include means for determining, based on a measure of relevance, a ranking of videos among the plurality of videos. The system may include means for determining, based on the ranking of videos, one or more salient videos from among the plurality of videos. The system may include means for obtaining one or more representations associated with individual ones of the one or more salient videos. The system may include means for presenting the one or more representations via a visual menu. The one or more representations may be arranged chronologically according to associated salient videos.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1A:
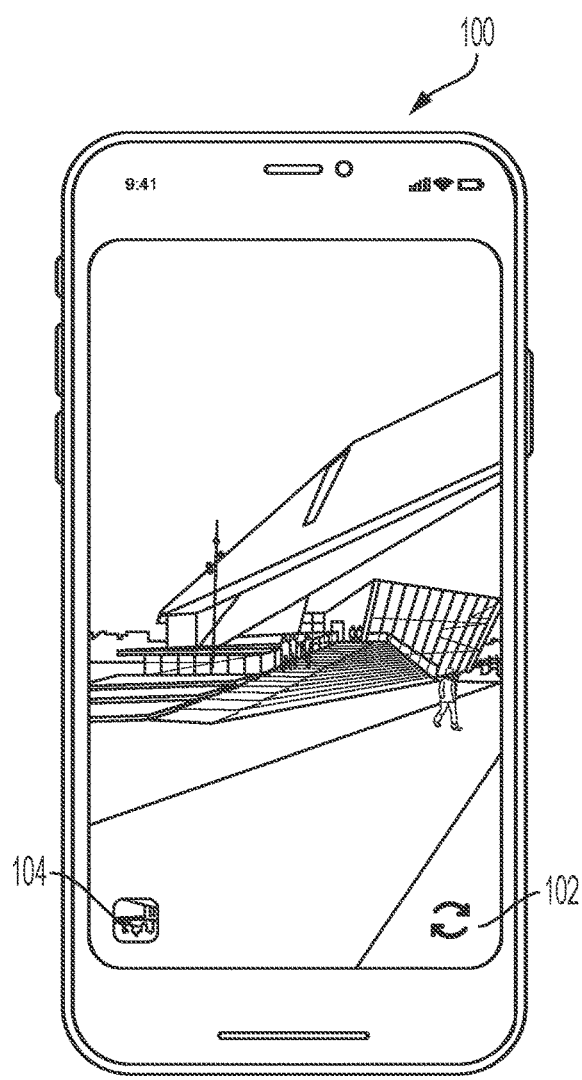
FIGS. 1A-1C illustrate exemplary video clip capture tools, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Videos are a popular way of communicating information and providing entertainment to people. Video-sharing services allow video clips to be recorded and shared with a network of users. The video clips may be navigated for a variety of purposes prior to being shared. Unfortunately, conventional video-sharing services provide limited video navigating capabilities. For example, existing timelines (e.g., scrollable timelines) showing thumbnails representing videos can be difficult to navigate. The thumbnails typically correspond to regular intervals in time (e.g., every two days) or video sequence (e.g., every seventh video in a series of videos. As such, the thumbnails shown in a timeline may not correspond to videos most relevant to what a user is searching for if the most relevant videos do not fall on the regular intervals. Furthermore, a thumbnail for a given video may be the first frame in the video or some other arbitrary frame. The frame of the given video used for its thumbnail may not depict what a user is searching for even though the full video might actually include what the user is searching for.

The subject disclosure provides for systems and methods for navigating video clips. A user is allowed to navigate video clips of a series of video clips by scrolling through thumbnails of the video clips normalized by relevance and displayed in a timeline. For example, the thumbnails may depict content from the video clips that is relevant to a search term.

Implementations described herein address these and other problems by determining thumbnails to show on a video timeline based on normalized relevancy of corresponding videos. Relevancy can be based on various information such as a user selection, a user input, a search query, a past selection, a past interest, a past behavior, a related user, or a similar user behavior. Thumbnails may be dynamically selected based on user interactions (e.g., zooming in on the timeline). For example, as the basis for the relevancy changes, so may the thumbnails shown on the timeline. Also, as the timeframe shown on the timeline changes (e.g., by zooming in or out), the thumbnails may change to convey the most relevant videos for the current timeframe.

The disclosed system addresses a problem in traditional media navigation tied to computer technology, namely, the technical problem of navigating through video clips. The disclosed system solves this technical problem by providing a solution also rooted in computer technology, namely, by providing for the ability to display a video timeline based on normalized relevancy of corresponding videos. The disclosed subject technology further provides improvements to the functioning of the computer itself because it reduces processing and bandwidth costs associated with conventional media navigation technology.

Figure 1B:
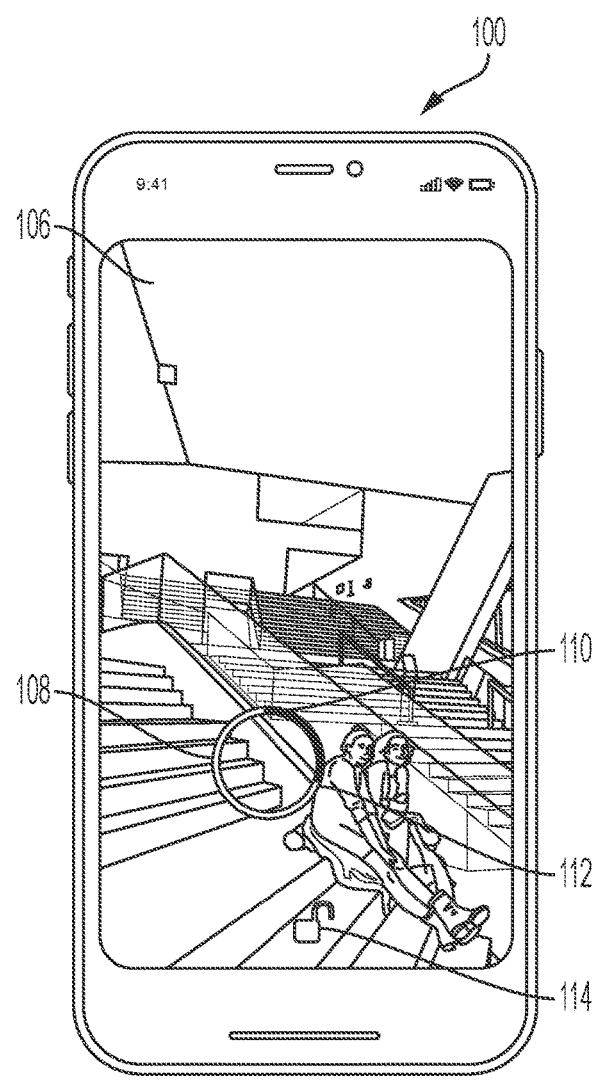
Figure 1C:
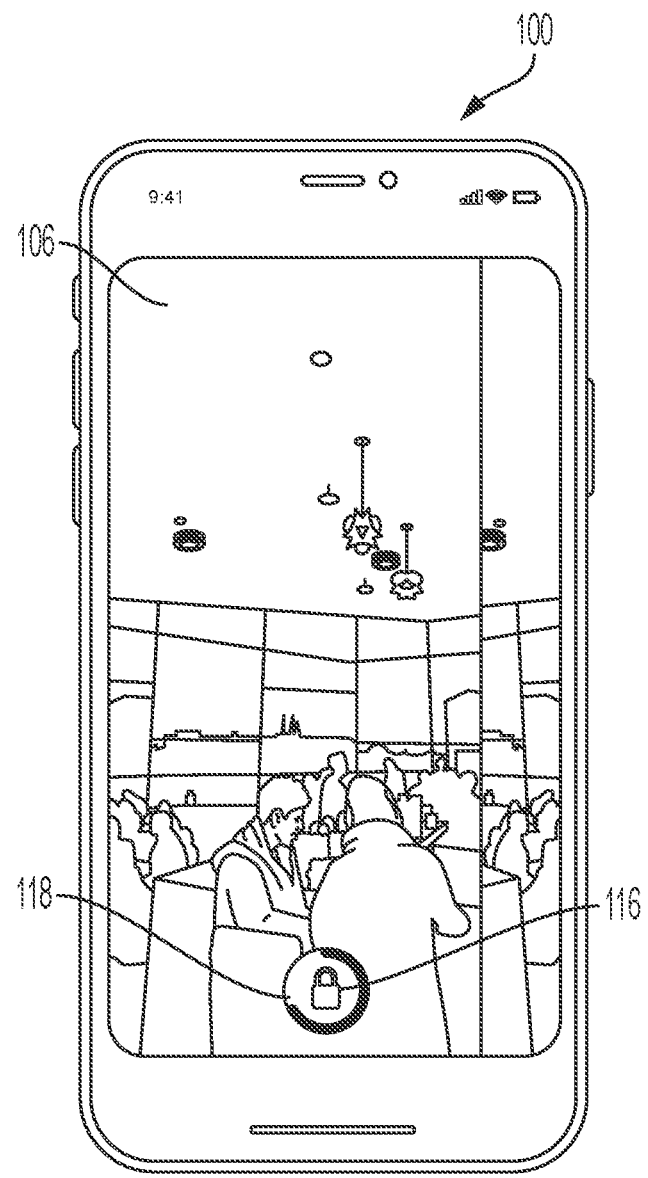

FIGS. 1A-1C illustrate exemplary video clip capture tools, according to certain aspects of the present disclosure. Referring to FIG. 1A, a video clip capture interface 100 is displayed. As illustrated, live video from a front camera or a back camera may provide video presented via video clip capture interface 100. A front camera may face a user. A back camera may face away from the user. Use of the front camera or the back camera may be toggled responsive to receipt of a user selection via an icon 102. In some implementations, video clip capture interface 100 may be configured such that a user may press on video clip capture interface 100 (e.g., anywhere or at a specific location) to start recording a video. An indication (e.g., visual, audio, haptic, etc.) to confirm that recording of the video has started may be provided for conveyance to the user. Video clip capture interface 100 may be configured such that video recording stops when the user releases pressure/contact from video clip capture interface 100. An indication (e.g., visual, audio, haptic, etc.) to confirm that recording of the video has stopped and/or the recorded video has been successfully saved may be provided for conveyance to the user. In some implementations, video clip capture interface 100 may be configured such that, responsive to video recording being stopped, a thumbnail representing the most recently recorded video may be presented via an icon 104.

According to some aspects, responsive to a user selection being received via icon 104, the most recently recorded video 106 may be presented via video clip capture interface 100, as illustrated in FIG. 1B. An icon 108 may represent a duration of video 106. Video clip capture interface 100 may be configured to facilitate trimming video 106. For example, a user selected starting point 110 and a user selected ending point 112 may be used to define which portion of video 106 should be kept. A user selection may be received via an icon 114 to save and/or lock the trimmed video 106. FIG. 1C illustrates a saved and/or locked version of trimmed video 106. An icon 116 may indicate that trimmed video 106 has been saved and/or locked. Icon 116 may convey a current point of playback 118 of trimmed video 106.

According to aspects, the illustrated exemplary video clip capture tools of the video clip capture interface 100 may be implemented in a user device (e.g., a smartphone, camera, computer, etc.) for recording videos. For example, a user may record multiple videos 106 in a chronological order. The videos may then be stitched together in a timeline (e.g., timeline 202). As will be described in more detail below in relation to FIGS. 2A-2D, the timeline may include a visual menu that facilitates navigating through the recorded videos 106 in an expedient manner. In an implementation, the timeline may be stored in storage. For example, the storage may be located locally on the user device, or may be located remotely on a server.

According to aspects, the videos 106 may be automatically stitched together after recording such that all of the videos 106 may viewed continuously back-to-back based on the chronological order of videos that were captured. For example, the stitching may include appending an end portion of a first video to a beginning portion of a second video. According to aspects, a transition may be included between the first video and the second video. For example, the transition may include fading in, fading out, and/or the like, as is commonly known in the art. Additionally, during playback, adjacent videos may be pre-buffered so that the videos playback seamlessly.

In an implementation, outer edges of the videos may be cropped in order to stabilize playback of the videos. For example, up to 0.5 inches may be trimmed from each of the length and width of the captured video area. It is understood that this is exemplary only, and other values may be utilized without departing from the scope of the disclosure. Additionally, the user may be allowed to adjust the amount of cropping done to the video through the video clip capture tools of the video clip capture interface 100.

Aspects of the present disclosure relate to a new paradigm of capturing videos, where cameras prioritize capturing videos over photos. This is advantageous because it allows a user to have improved access to recorded videos based on the flow of time. For example, the user may simply scroll through the timeline of the stitched together videos to access their recorded videos. In this way users may easily create a high quality video diary of their daily activities, which they may view and share with others.

Figures 2A, 2B:
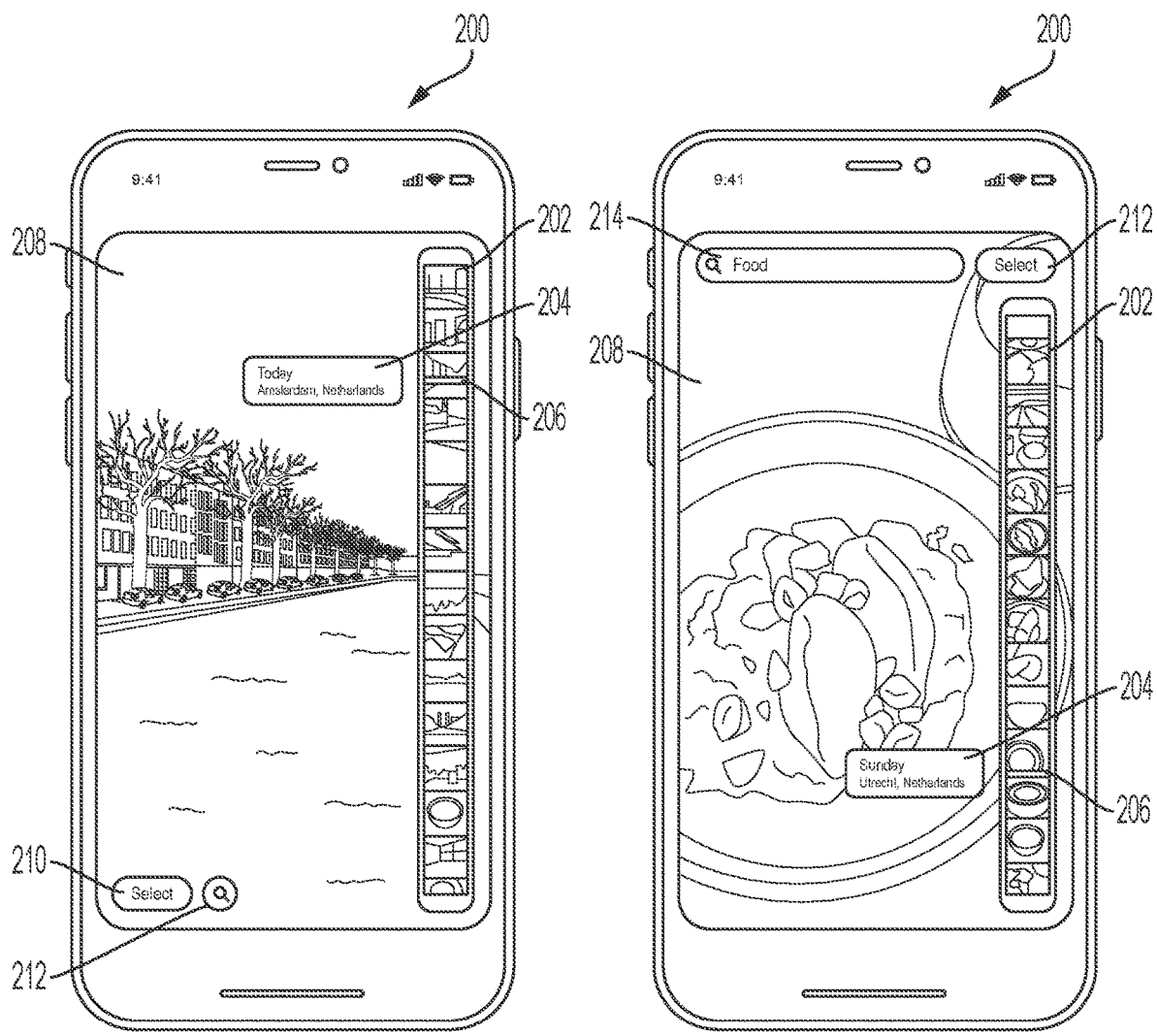
FIGS. 2A-2D illustrate exemplary video clip navigating tools, according to certain aspects of the present disclosure.

FIGS. 2A-2D illustrate exemplary video clip navigating tools, according to certain aspects of the present disclosure. Referring to FIG. 2A, a video navigating user interface 200 is displayed. As illustrated, a user may be navigating videos in a collection of videos. A timeline 202 may show video clips previously recorded in a series of video clips. Individual video clips in timeline 202 may be represented by thumbnails. The thumbnails actually shown in timeline 202 may reflect a subset of the collections of videos navigable via timeline 202. In some implementations, the shown thumbnails may be selected based on normalized relevance. The timeline 202 may be scrollable by a user. For example, as illustrated, a user may swipe up or down to scroll through timeline 202.

According to aspects, the timeline 202 may show metadata 204 of individual video clips, for example, at a user selected position 206 along the length of the timeline 202 marking an individual video. Metadata 204 may include one or more of date information describing when the video clip at user selected position 206 was recorded or otherwise obtained, location information describing a geographic location where the video at user selected position 206 was recorded, a description of content included in the video clip at user selected position 206, and/or other metadata.

According to additional aspects, the timeline 202 may include a visual menu. For example, the visual menu may include a scrolling menu. The scrolling menu may be a horizontal-scrolling menu. The scrolling menu may also be a vertical-scrolling menu. In an implementation, the scrolling menu may represent the timeline 202. According to aspects, the timeline 202 may be visual a timeline (e.g., as illustrated in FIGS. 2A-2D) or a non-visual timeline. For example, the non-visual timeline may be hidden from view when the scrolling menu is not being used. The non-visual timeline may also be configured and/or adjusted to be displayed as an outline, or be invisible when not in use.

Video navigating user interface 200 may include preview 208. In some implementations, preview 208 may include imagery associated the video at user selected position 206. The imagery of preview 208 may include one or more of a frame of the corresponding video clip, a few frames of the corresponding video clip, a full version of the corresponding video clip, a low-resolution version of the corresponding video clip, and/or other imagery. A select button 210 may be configured to receive a user selection to select the video at user selected position 206 for sharing, editing, and/or other uses. A search icon 212 may be configured to receive user input to initiate and/or perform a search of videos navigable via timeline 202.

As illustrated in FIG. 2B, a search inquiry may be inputted into a search field 214. Search field 214 may become available responsive to search icon 212 (see FIG. 2A) being clicked. The thumbnails shown in timeline 202 may be normalized by relevance to a search term entered into search field 214. The thumbnails shown in timeline 202 may change depending on what is entered via search field 214. For example, if a search term (e.g., the word "food") was entered in search field 214, the thumbnails may display thumbnails from corresponding video clips depicting content related or relevant to that search term (e.g., video clips depicting food). The thumbnails may show one or more frames depicting content related or relevant to that search term. Videos in timeline 202 that do not include any search-term-related content may not be represented via thumbnails in timeline 202. Videos in timeline 202 that do not include a given search-term-related content may not be accessible via timeline 202 when the given search term is entered into search field 214.

According to aspects, metadata 204 may change depending on what is entered via search field 214. For example, if a generic search term (e.g., the term "food") is entered via search field 214, metadata 204 may include a description of specific examples (e.g., "seafood" or "fish") of the generic search term depicted in the video at user selected position 206 in timeline 202.

Figure 2C:
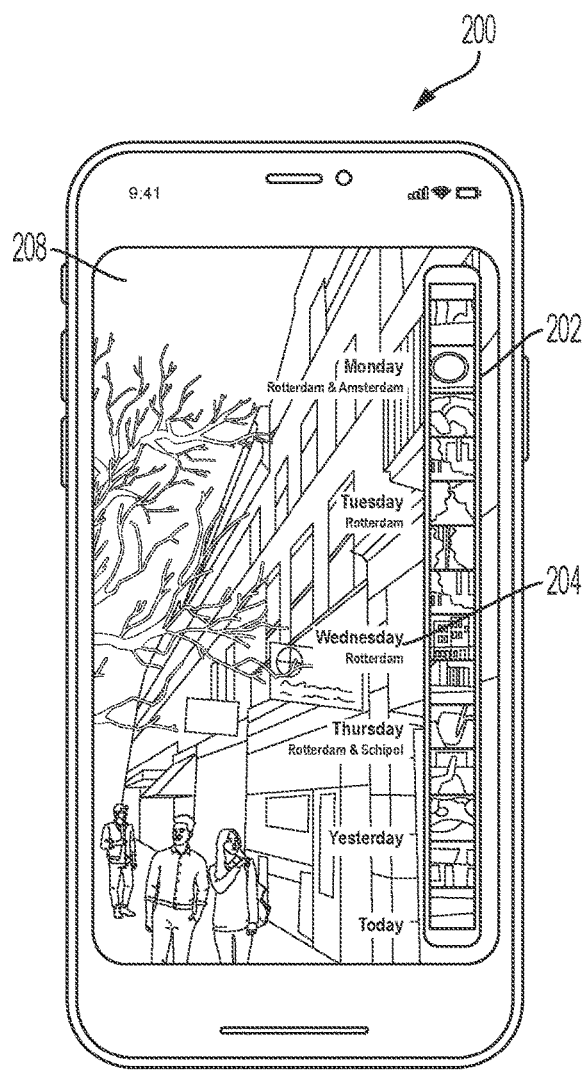
Figure 2D:
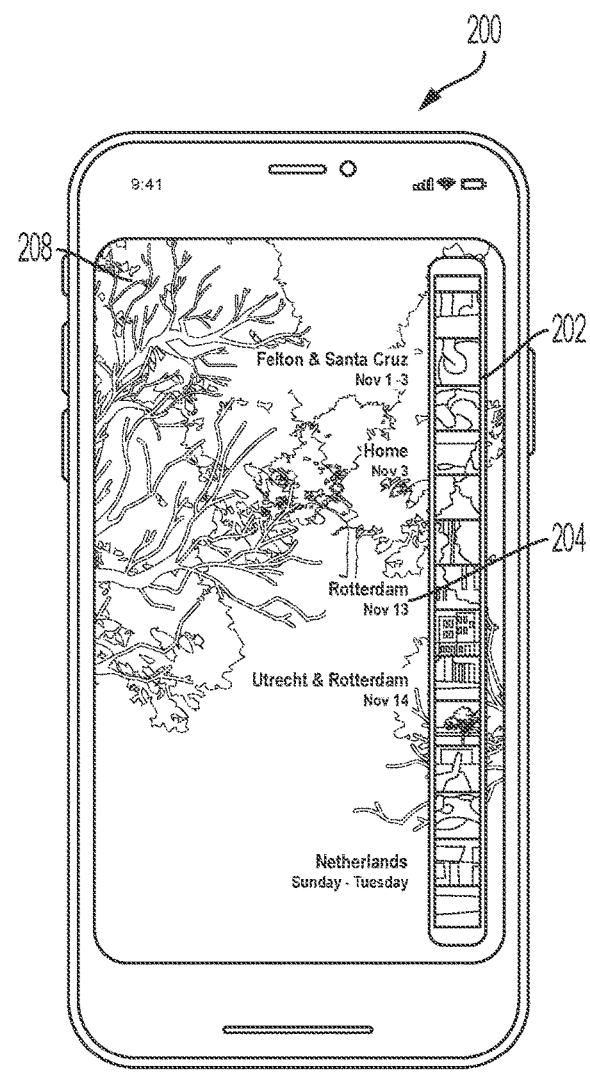

Timeline 202 may be configured to be zoomed in and zoomed out. As illustrated in FIG. 2C, timeline 202 is normalized by time and is resolved to represent six days of videos (see metadata 204). In FIG. 2D, timeline 202 is illustrated as being zoomed out representing a longer duration of time than the six days shown in FIG. 2C. According to aspects, zooming into or out of timeline 202 may be achieved by a gesture (e.g., pinching or un-pinching) on timeline 202. As the duration of the timeframe visible in timeline 202 changes, the thumbnails in timeline 202 may also change. According to aspects, the number of thumbnails shown in timeline 202 may remain constant such that the duration to time represented by individual thumbnails changes as the depicted timeframe changes. Metadata 204 may change as the timeframe of timeline 202 changes. For example, in FIG. 2D, instead of date information, metadata 204 prominently marks changes in location of videos navigable by timeline 202.

According to additional aspects, a machine learning model may be trained to identify points of interest in the plurality of videos, and generate the thumbnails based on the identified points of interest. For example, the machine learning model may include any of supervised and/or unsupervised models known in the art. As a result, the machine learning model may be trained through the steps outlined herein to identify points of interest in the plurality of videos and generate the thumbnails based on the identified points of interest.

Figure 3:
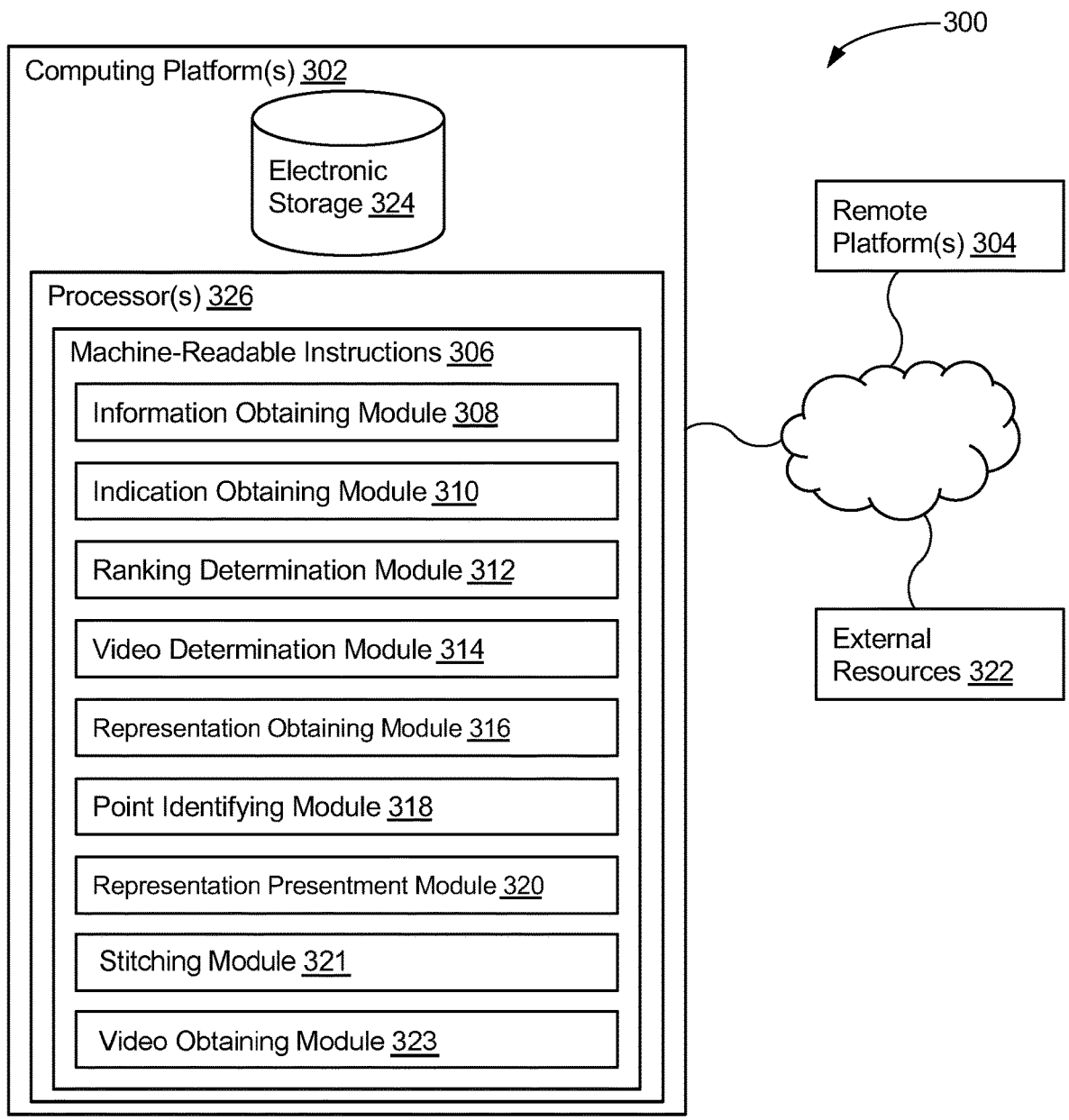
FIG. 3 illustrates a system configured for managing video clips, in accordance with one or more implementations

FIG. 3 illustrates a system 300 configured for managing video clips, according to certain aspects of the disclosure. Managing video clips may include capturing video clips, navigating video clips, and/or other video clip managing functions. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of information obtaining module 308, indication obtaining module 310, ranking determination module 312, video determination module 314, representation obtaining module 316, point identifying module 318, representation presentment module 320, stitching module 321, video obtaining module 323, and/or other instruction modules.

Information obtaining module 308 may be configured to obtain information associated with a plurality of videos. The plurality of videos may include one or more of a collection of videos, a digital film roll, a video album, or a shared video album. The plurality of videos may be associated with a social media account. By way of non-limiting example, the information associated the plurality of videos may include one or more of video files containing individual ones of the plurality of videos, an index of the plurality of videos, or metadata of individual ones of the plurality of videos.

Indication obtaining module 310 may be configured to obtain an indication of a user interaction with the plurality of videos. The user interaction with the plurality of videos may include a selection of a timeframe corresponding to a subset of the plurality of videos. The selection of the timeframe corresponding to the subset of the plurality of videos may include a zoom in or a zoom out on a timeline. The timeline may include thumbnails of individual ones of the plurality of videos. The selection of the timeframe corresponding to the subset of the plurality of videos may include one or both of a start date or an end date.

The user interaction with the plurality of videos may include a selection of a given video of the plurality of videos. The given video of the plurality of videos may include a content item. By way of non-limiting example, the content item may include one or more of a person, an object, a depiction of an activity, or a place. The user interaction with the plurality of videos may include an identification of a type of content item. By way of non-limiting example, the type of content item includes one or more of a person, an object, a depiction of an activity, or a place.

The indication of the user interaction may include a type of user interaction. By way of non-limiting example, the type of user interaction may include one or more of a selection, an input, a gesture, a swipe, or a scroll.

Ranking determination module 312 may be configured to determine, based on a measure of relevance, a ranking of videos among the plurality of videos. By way of non-limiting example, the measure of relevance may quantify relevance between individual videos of the plurality of videos and one or more of other videos based on at least one of a plurality of factors. The plurality of factors may include one or more of other related videos, a user selection, a user input, a search query, a past selection, a past interest, a past behavior, a related user, a similar user behavior, a given timeframe, a given type of general content, a given type of specific content, a time, a date, a duration of time, or a frequency of content contained in a given video being found in other videos. In some implementations, quantifying relevance may include quantifying one or more of sharing similar content, a prominence of similar content in a given video, a user selection, a relevance to a user input, a number of frames that include relevant content, a number of views, a number of shares, a number of reactions, a number of videos with related content, or a number of videos within a given timeframe of being captured.

By way of non-limiting example, the measure of relevance may normalize relevance of individual videos of the plurality of videos based on data including one or more of other videos, other related videos, a user selection, a user input, a search query, a past selection, a past interest, a past behavior, a related user, a similar user behavior, a given timeframe, a given type of general content, a given type of specific content, a time, a date, a duration of time, or a frequency of content contained in a given video being found in other videos. In some implementations, normalizing relevance may include scaling data values to fit within a value range (e.g., within the range of zero and one, or other ranges). Normalizing relevance may include taking a moving average of values in a moving time window. Normalizing relevance may include weighting data values based on one or more of k-nearest neighbors, linear regression, other regressions, and/or other weighting techniques.

The ranking of videos may correspond to a subset of the plurality of videos. The subset of the plurality of videos may correspond to a timeframe during which the subset of the plurality of videos was captured. The subset of the plurality of videos may correspond to videos containing a type of content. The type of content item may include one or more of a person, an object, a depiction of an activity, or a place. The type of content may be specific. The type of content may be general.

Video determination module 314 may be configured to determine, based on the ranking of videos, one or more salient videos from among the plurality of videos. According to some aspects, a given salient video may include a video that is within a range of the ranking of videos (e.g., top twenty ranked videos, or other ranges). As discussed further in connection with representation obtaining module 316, point identifying module 318, and/or representation presentment module 320, salient videos may be presented to a user via an interface (e.g., the video navigating user interface 200 of FIG. 2). For example, thumbnails associated with individual salient videos may be presented via a scrollable video timeline. In some implementations, salient videos may be "sticky" when a user scrolls through the timeline. That is, a scrolling visualization may pause at salient videos within the timeline.

By way of non-limiting example, the one or more salient videos may include content that is relevant to one or more of other videos, other related videos, a user selection, a user input, a search query, a past selection, a past interest, a past behavior, a related user, a similar user behavior, a given timeframe, a given type of general content, a given type of specific content, a time, a date, or a duration of time. Determining the one or more salient videos may include identifying one or more highest ranked videos as the one or more salient videos. Determining the one or more salient videos may include identifying one or more highest ranked videos in specific timeframes of the one or more salient videos. Determining the one or more salient videos may include identifying one or more highest ranked videos in successive timeframes of the one or more salient videos.

Representation obtaining module 316 may be configured to obtain one or more representations associated with individual ones of the one or more salient videos. A given representation may convey content associated with a salient video. A given representation of a salient video may include a visual representation. By way of non-limiting example, a given representation of a salient video may include one or more of a thumbnail, a frame of the salient video, a highlight reel of the salient video, or a full version of the salient video. A given thumbnail may represent a duration of time. A given thumbnail may include one or more video frames from a corresponding video represented by the given thumbnail. A given thumbnail may include one or more video frames derived from one or more frames of a corresponding video represented by the given thumbnail.

Obtaining the one or more representations may include chunking and downloading individual ones of the one or more salient videos. The individual ones of the one or more salient videos may be downloaded in chronological order. The one or more representations may include low resolution versions of individual ones of the one or more salient videos.

Point identifying module 318 may be configured to identify, based on the ranking of videos, one or more sticky points within a timeline associated with the plurality of videos. The timeline may correspond to a series of thumbnails of videos arranged chronologically and falling within a given timeframe. The individual ones of the one or more sticky points may correspond to specific thumbnails in the series of thumbnails of videos. The specific thumbnails at the one or more sticky points may be presented when the series of thumbnails of the timeline are scrolled through.

Identifying the one or more sticky points may include identifying the highest ranked videos.

Representation presentment module 320 may be configured to present the one or more representations via a visual menu of the timeline 202. The one or more representations may be arranged chronologically according to associated salient videos. The visual menu may include a scrolling menu. The scrolling menu may be a horizontal-scrolling menu. The scrolling menu may be a vertical-scrolling menu. The scrolling menu may represent a timeline.

The timeline may be configured to allow zooming in and zooming out. Zooming into the timeline may reduce a timeframe visible in the timeline. Zooming into the timeline may reduce a duration of time represented by individual thumbnails visible in the timeline. Zooming out of the timeline may increase a timeframe visible in the timeline. Zooming out of the timeline may increase a duration of time represented by individual thumbnails visible in the timeline. By way of non-limiting example, a duration of time represented by individual thumbnails visible in the timeline may include one or more of one second, thirty seconds, one minute, thirty minutes, one hour, three hours, twelve hours, eighteen hours, one day, three days, one week, two weeks, one month, three months, six months, one year, three years, ten years, or thirty years, or more. It is understood that these values are exemplary only and that other values fit within the scope of this disclosure.

Stitching module 321 may be configured to stitch a plurality of videos together in a timeline. In one or more implementations, the stitching module 321 may stitch the plurality of videos together in a timeline. According to aspects, the plurality of videos may be stitched together based on a chronological order of when the videos were recorded.

Video obtaining module 323 may be configured to obtain a plurality of videos. In one or more implementations, the video obtaining module 323 may obtain a plurality of videos recorded in a chronological order. For example, the chronological order may be based on a time of recording of a video.

In some implementations, computing platform(s) 302, remote platform(s) 304, and/or external resources 322 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 322 may be operatively linked via some other communication media.

A given remote platform 304 may include one or more processors configured to execute computer program modules. The computer program modules may be configured to enable an expert or user associated with the given remote platform 304 to interface with system 300 and/or external resources 322, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 322 may include sources of information outside of system 300, external entities participating with system 300, and/or other resources. In some implementations, some or all of the functionality attributed herein to external resources 322 may be provided by resources included in system 300.

Computing platform(s) 302 may include electronic storage 324, one or more processors 326, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 324 may comprise non-transitory storage media that electronically stores information. The electronic storage media of electronic storage 324 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 324 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 324 may include one or more virtual storage resources (e.g., cloud storage, a virtual private network, and/or other virtual storage resources). Electronic storage 324 may store software algorithms, information determined by processor(s) 326, information received from computing platform(s) 302, information received from remote platform(s) 304, and/or other information that enables computing platform(s) 302 to function as described herein.

Processor(s) 326 may be configured to provide information processing capabilities in computing platform(s) 302. As such, processor(s) 326 may include one or more of a digital processor, an analog processor, a digital circuit designed to process information, an analog circuit designed to process information, a state machine, and/or other mechanisms for electronically processing information. Although processor(s) 326 is shown in FIG. 3 as a single entity, this is for illustrative purposes only. In some implementations, processor(s) 326 may include a plurality of processing units. These processing units may be physically located within the same device, or processor(s) 326 may represent processing functionality of a plurality of devices operating in coordination. Processor(s) 326 may be configured to execute modules 308, 310, 312, 314, 316, 318, 320, 321, and/or 323, and/or other modules. Processor(s) 326 may be configured to execute modules 308, 310, 312, 314, 316, 318, 320, 321, and/or 323, and/or other modules by software; hardware; firmware; some combination of software, hardware, and/or firmware; and/or other mechanisms for configuring processing capabilities on processor(s) 326. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, 321, and/or 323 are illustrated in FIG. 3 as being implemented within a single processing unit, in implementations in which processor(s) 326 includes multiple processing units, one or more of modules 308, 310, 312, 314, 316, 318, 320, 321, and/or 323 may be implemented remotely from the other modules. The description of the functionality provided by the different modules 308, 310, 312, 314, 316, 318, 320, 321, and/or 323 described below is for illustrative purposes, and is not intended to be limiting, as any of modules 308, 310, 312, 314, 316, 318, 320, 321, and/or 323 may provide more or less functionality than is described. For example, one or more of modules 308, 310, 312, 314, 316, 318, 320, 321, and/or 323 may be eliminated, and some or all of its functionality may be provided by other ones of modules 308, 310, 312, 314, 316, 318, 320, 321, and/or 323. As another example, processor(s) 326 may be configured to execute one or more additional modules that may perform some or all of the functionality attributed below to one of modules 308, 310, 312, 314, 316, 318, 320, 321, and/or 323.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
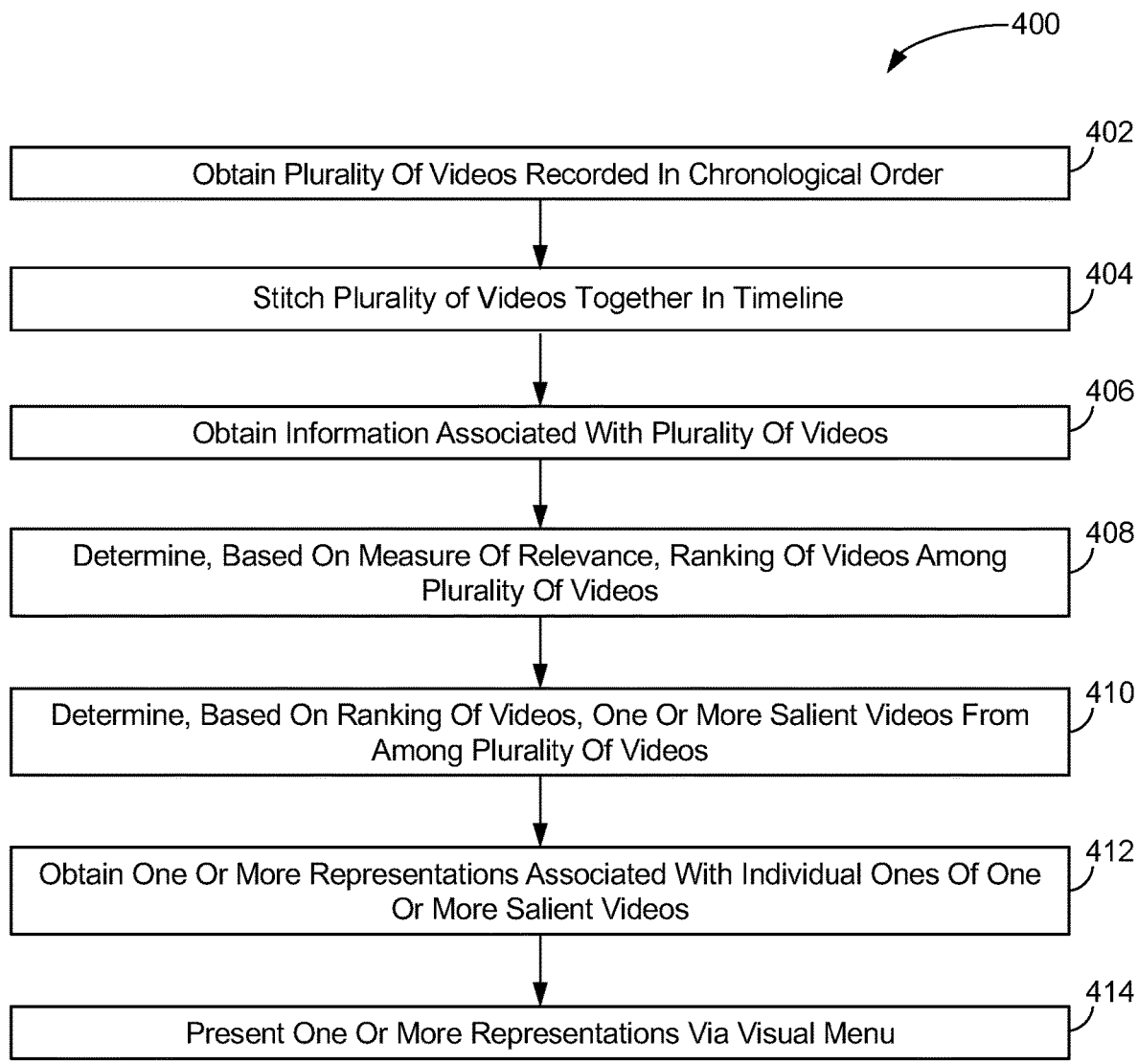
FIG. 4 illustrates an example flow diagram for managing video clips, according to certain aspects of the disclosure.

FIG. 4 illustrates an example flow diagram (e.g., process 400) for managing video clips, according to certain aspects of the disclosure. For explanatory purposes, the example process 400 is described herein with reference to FIGS. 1A-1C, 2A-2D, and 3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1A-1C, 2A-2D, and 3.

At step 402, the process 400 may include obtaining a plurality of videos recorded in a chronological order (e.g., chronologically). At step 404, the process 400 may include stitching the plurality of videos together in a timeline based on the chronological order. According to aspects, the timeline may include a visual menu.

At step 406 the process 400 may include obtaining information associated with the plurality of videos. At step 408, the process 400 may include determining, based on a measure of relevance, a ranking of videos among the plurality of videos. According to aspects, the measure of relevance normalizes relevance of individual videos of the plurality of videos based on at least one of a plurality of factors.

At step 410, the process 400 may include determining, based on the ranking of videos, one or more salient videos from among the plurality of videos. According to aspects, the one or more salient videos may include a video that is within a range of the ranking of videos.

At step 412, the process 400 may include obtaining one or more representations associated with individual ones of the one or more salient videos. At step 414, the process 400 may include causing display of the one or more representations arranged in the timeline. The one or more representations arranged based at least in part on the chronological order. According to aspects, the one or more representations may also be arranged according to associated salient videos.

For example, as described above in relation to FIGS. 2A-1D and 3, at step 402, the process 400 may include obtaining a plurality of videos recorded in a chronological order (e.g., through video obtaining module 323). At step 404 the process 400 may include stitching the plurality of videos together in a timeline based on the chronological order (e.g., through stitching module 321). In one or more implementations, the timeline may include a visual menu. At step 406, the process 400 may include obtaining (e.g., through information obtaining module 308) information associated with the plurality of videos. At step 408, the process 400 may include determining (e.g., through ranking determination module 312), based on a measure of relevance, a ranking of videos among the plurality of videos, wherein the measure of relevance normalizes relevance of individual videos of the plurality of videos based on at least one of a plurality of factors. At step 410, the process 400 may include determining (e.g., through video determination module 314), based on the ranking of videos, one or more salient videos from among the plurality of videos, the one or more salient videos comprising a video that is within a range of the ranking of videos. At step 412, the process 400 may include obtaining (e.g., through representation obtaining module 316) one or more representations associated with individual ones of the one or more salient videos. At step 414, the process 400 may include causing display of (e.g., through representation presentment module 320) the one or more representations in the timeline. The one or more representations may be arranged based at least in part on the chronological order and according to associated salient videos.

According to an aspect, the plurality of videos is associated with a social media account. According to an aspect, the process 400 may include obtaining an indication of a user interaction with the plurality of videos. According to an aspect, the plurality of factors includes at least one or more of other videos, other related videos, a user selection, a user input, a search query, a past selection, a past interest, a past behavior, a related user, a similar user behavior, a given timeframe, a given type of general content, a given type of specific content, a time, a date, a duration of time, or a frequency of content contained in a given video being found in other videos. According to an aspect, a given representation of a salient video includes one or more of a thumbnail, a frame of the salient video, a highlight reel of the salient video, or a full version of the salient video. According to an aspect, a given thumbnail represents a duration of time.

According to an aspect, the process 400 may include identifying, based on the ranking of videos, one or more sticky points within a timeline associated with the plurality of videos. According to an aspect, the visual menu includes a scrolling menu. According to an aspect, the scrolling menu represents a timeline. According to an aspect, the timeline is configured to allow zooming in and zooming out, wherein zooming into the timeline reduces a timeframe visible in the timeline, wherein zooming out of the timeline increases a timeframe visible in the timeline.

Figure 5:
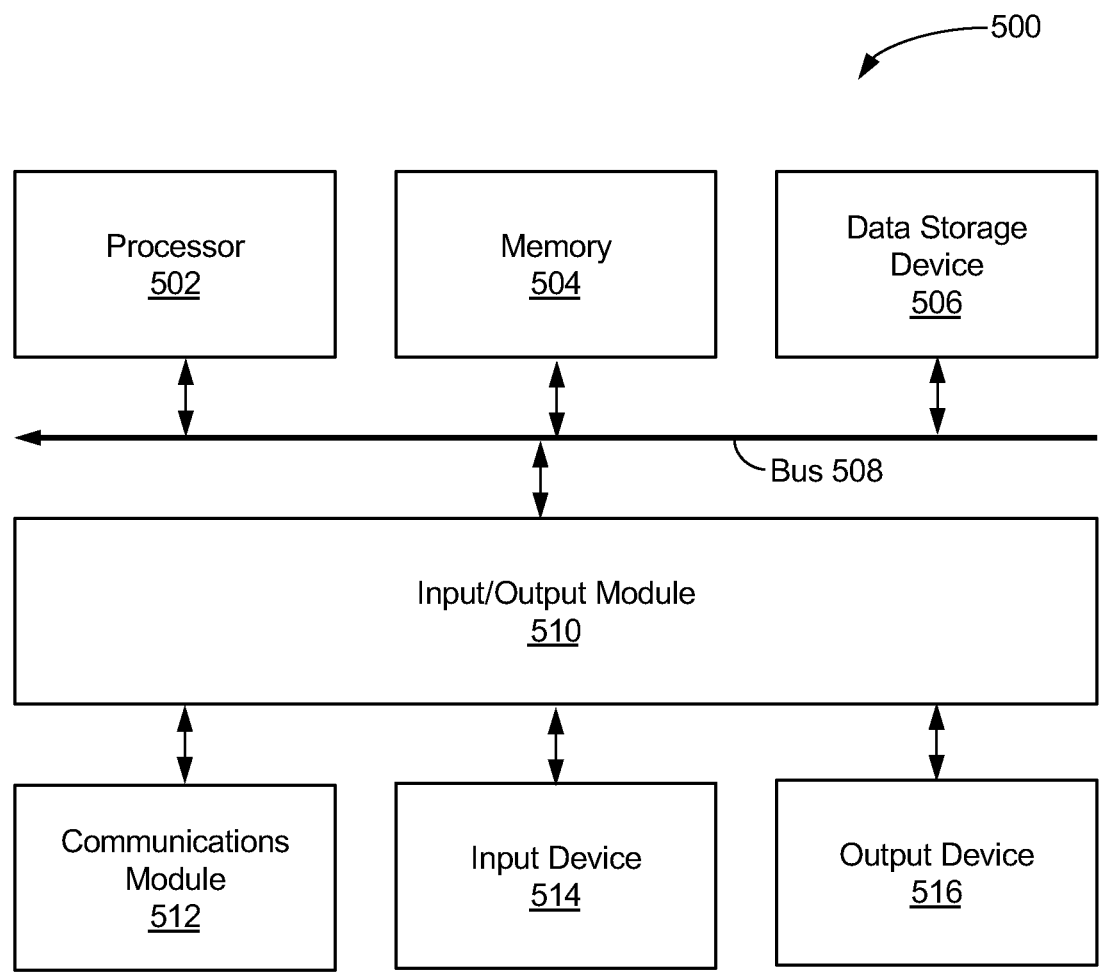
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as a LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for video navigation, the method comprising:
    obtaining a plurality of videos recorded in a chronological order;
    stitching the plurality of videos together in a timeline based on the chronological order, the timeline comprising a visual menu to form a playback video, wherein an end portion of a first video in the plurality of videos fades out and a start portion of a second video in the plurality of videos fades in during a playback, and a visible timeframe of the timeline is adjustable;
    obtaining information associated with the plurality of videos;
    determining, based on a measure of relevance, a ranking of videos among the plurality of videos, wherein the measure of relevance normalizes relevance of individual videos of the plurality of videos based on at least one of a plurality of factors;

determining, based on the ranking of videos, one or more salient videos from among the plurality of videos, the one or more salient videos comprising a video that is within a range of the ranking of videos;

obtaining one or more representations associated with individual ones of the one or more salient videos;

identifying, based on the ranking of videos, a one or more sticky points within a timeline associated with the one or more salient videos;

pausing a scrolling visualization of the one or more salient videos at the sticky point; and displaying the one or more representations in the timeline corresponding to the one or more sticky points associated with at least one high rank video of the one or more salient videos in the timeline during the scrolling visualization, the one or more representations being arranged based at least in part on the chronological order and according to associated salient videos, wherein a number of the one or more representations displayed in the timeline is constant, and a duration of time of individual ones of the one or more representations displayed in the timeline changes based on adjustments to the visible timeframe of the timeline.

2. The computer-implemented method of claim 1, wherein the plurality of videos is associated with a social media account.

3. The computer-implemented method of claim 1, further comprising: obtaining an indication of a user interaction with the plurality of videos.

4. The computer-implemented method of claim 1, wherein the plurality of factors comprises one or more of other videos, other related videos, a user selection, a user input, a search query, a past selection, a past interest, a past behavior, a related user, a similar user behavior, a given timeframe, a given type of general content, a given type of specific content, a time, a date, a duration of time, or a frequency of content contained in a given video being found in other videos.

5. The computer-implemented method of claim 1, wherein a given one of the representations associated with the one or more salient videos includes one or more of a thumbnail, a frame of the one or more salient videos, a highlight reel of the one or more salient videos, or a full version of the one or more salient videos.

6. The computer-implemented method of claim 5, wherein the thumbnail represents a duration of time.

7. The computer-implemented method of claim 1, wherein the visual menu includes a scrolling menu.

8. The computer-implemented method of claim 7, wherein the scrolling menu represents the timeline.

9. The computer-implemented method of claim 8, wherein the timeline is configured to allow zooming in and zooming out to adjust the visible timeframe of the timeline, wherein the zooming in the timeline reduces the visible timeframe in the timeline, wherein the zooming out of the timeline increases the visible timeframe in the timeline.

10. A system configured for video navigation, the system comprising:

one or more hardware processors configured by machine-readable instructions to: obtain a plurality of videos recorded in a chronological order;

stitch the plurality of videos together in a timeline based on the chronological order, the timeline comprising a visual menu to form a playback video, wherein an end portion of a first video in the plurality of videos fades out and a start portion of a second video in the plurality of videos fades in during a playback, and a visible timeframe of the timeline is adjustable;

obtain information associated with the plurality of videos;

determine, based on a measure of relevance, a ranking of videos among the plurality of videos, wherein the measure of relevance normalizes relevance of individual videos of the plurality of videos based on at least one of a plurality of factors;

determine, based on the ranking of videos, one or more salient videos from among the plurality of videos, the one or more salient videos comprising a video that is within a range of the ranking of videos;

obtain one or more representations associated with individual ones of the one or more salient videos;

identify, based on the ranking of videos, a one or more sticky points within a timeline associated with the one or more salient videos;

pause a scrolling visualization of the one or more salient videos at the sticky point;

and display the one or more representations in the timeline corresponding to the one or more sticky points associated with at least one high rank video of the one or more salient videos in the timeline during the scrolling visualization, the one or more representations being arranged based at least in part on the chronological order and according to associated salient videos, wherein a number of the one or more representations displayed in the timeline is constant, and a duration of time of individual ones of the one or more representations displayed in the timeline changes based on adjustments to the visible timeframe of the timeline.

11. The system of claim 10, wherein the plurality of videos is associated with a social media account.

12. The system of claim 10, wherein the one or more hardware processors are further configured by machine-readable instructions to:

obtain an indication of a user interaction with the plurality of videos.

13. The system of claim 10, wherein the plurality of factors comprises one or more of other videos, other related videos, a user selection, a user input, a search query, a past selection, a past interest, a past behavior, a related user, a similar user behavior, a given timeframe, a given type of general content, a given type of specific content, a time, a date, a duration of time, or a frequency of content contained in a given video being found in other videos.

14. The system of claim 10, wherein one of the representations associated with the one or more salient videos includes one or more of a thumbnail, a frame of the one or more salient videos, a highlight reel of the one or more salient videos, or a full version of the one or more salient videos.

15. The system of claim 14, wherein the thumbnail represents a duration of time.

16. The system of claim 10, wherein the visual menu includes a scrolling menu, wherein the scrolling menu represents the timeline.

17. The system of claim 16, wherein the timeline is configured to allow zooming in and zooming out to adjust the visible timeframe of the timeline, wherein the zooming in the timeline reduces the visible timeframe in the timeline, and wherein the zooming out of the timeline increases the visible timeframe in the timeline.

18. A non-transitory computer-readable storage medium having instructions embodied thereon, being executable by one or more processors to perform a method for video navigation, the method comprising:
- obtaining a plurality of videos recorded in a chronological order;
- stitching the plurality of videos together in a timeline based on the chronological order, the timeline comprising a visual menu to form a playback video, wherein an end portion of a first video in the plurality of videos fades out and a start portion of a second video in the plurality of videos fades in during a playback, and a visible timeframe of the timeline is adjustable;
- obtaining information associated with the plurality of videos;
- determining, based on a measure of relevance, a ranking of videos among the plurality of videos, wherein the measure of relevance normalizes relevance of individual videos of the plurality of videos based on at least one of a plurality of factors;
- determining, based on the ranking of videos, one or more salient videos from among the plurality of videos, the one or more salient videos comprising a video that is within a range of the ranking of videos;
- obtaining one or more representations associated with individual ones of the one or more salient videos;
- identifying, based on the ranking of videos, a one or more sticky points within a timeline associated with the one or more salient videos;
- pausing a scrolling visualization of the one or more salient videos at the sticky point; and
- displaying the one or more representations in the timeline corresponding to the one or more sticky points associated with at least one high rank video of the one or more salient videos in the timeline during the scrolling visualization, the one or more representations being arranged based at least in part on the chronological order and according to associated salient videos, wherein causing display of the one or more representations comprises pausing a scrolling visualization of the one or more salient videos, wherein a number of the one or more representations displayed in the timeline is constant, and a duration of time of individual ones of the one or more representations displayed in the timeline changes based on adjustments to the visible timeframe of the timeline.

* * * * *